Patented July 1, 1941

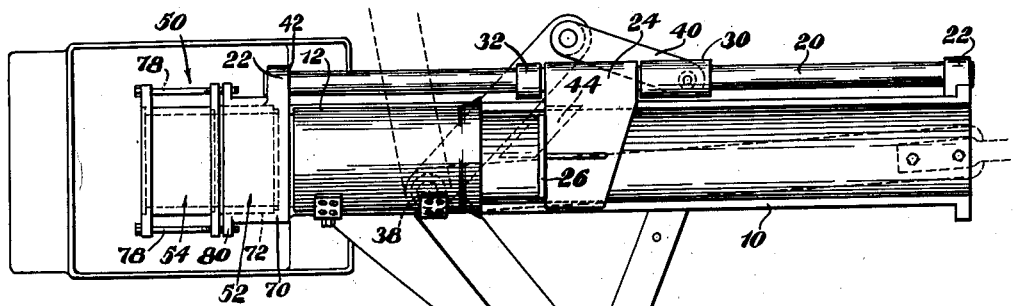
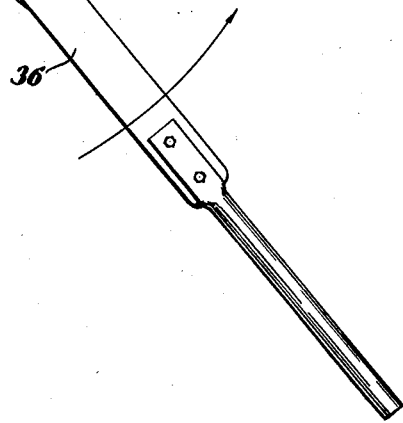
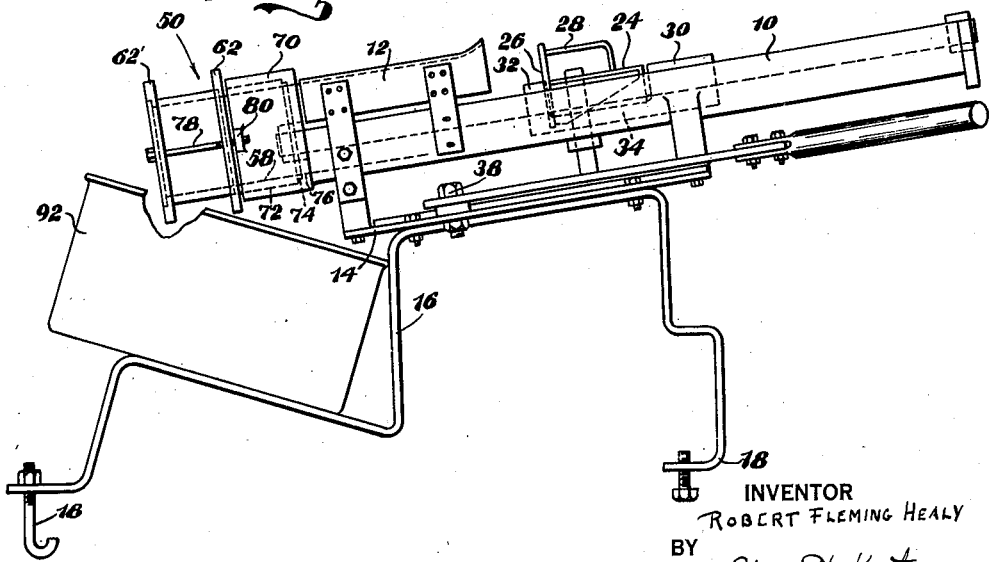

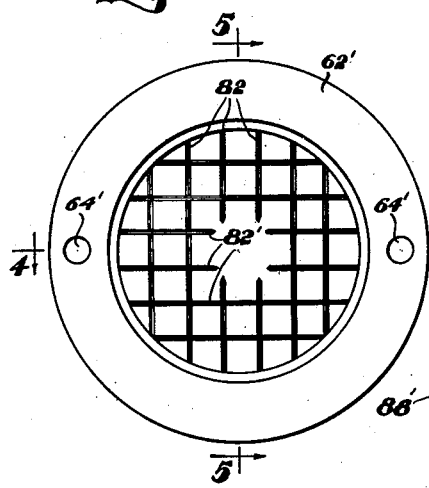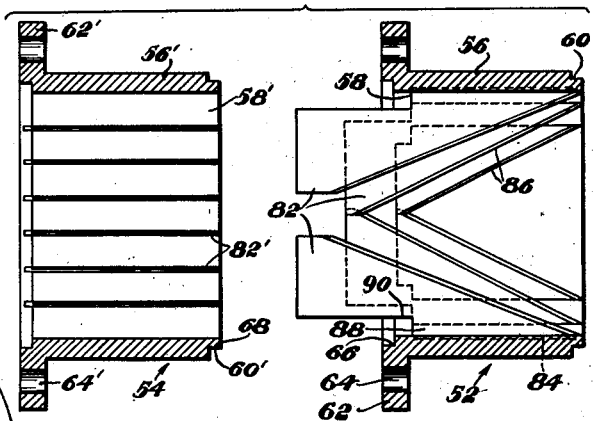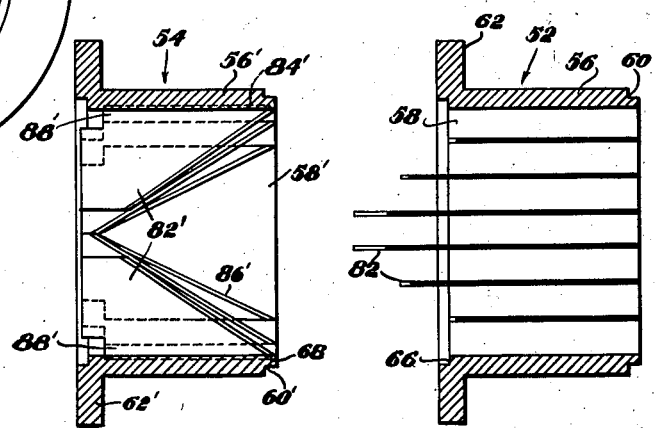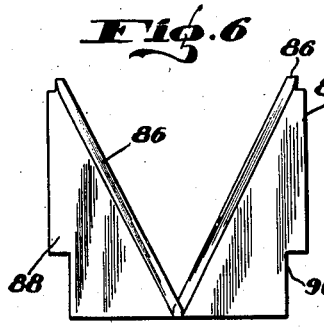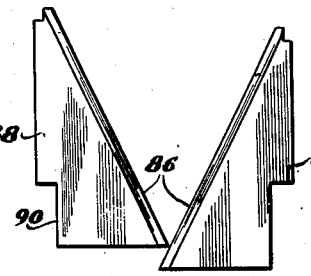

2,247,810

UNITED STATES PATENT OFFICE 2,247,810

APPARATUS FOR CUTTING FRUIT

Robert Fleming Healy, Honolulu, Territory of Hawaii, assignor to Hawaiian Pineapple Company, Limited, Honolulu, Territory of Hawaii, a corporation of Hawaii Application July 12, 1940, Serial No. 345,053

9 Claims. (Cl. 146—6)

The present invention relates to apparatus for cutting fruit and more particularly to apparatus for subdividing pineapple slices into smaller units.

The invention is primarily concerned with the production from whole pineapple slices of a plurality of small cubes or other regularly shaped portions which require criss-cross cutting of the slices. Machines that have been heretofore developed for this purpose have generally been of complex design, costly to construct, difficult to operate and to maintain in adjustment, and have failed to accomplish the cutting with the cleanness and accuracy desirable.

An object of the invention is to provide apparatus for the purpose referred to which is comparatively simple and inexpensive to build and operate, yet which effects the desired cutting cleanly and with high accuracy. A further object of the invention is to provide such apparatus in which the cutting is effected by a cutting head having fixed blades, thus avoiding the complexity of moving blade cutters, the blades being so designed as to have the clean cutting action of a moving blade. These and other objects and advantages of the invention will be apparent from the ensuing more particular description and from the accompanying drawings, wherein:

Fig. 1 is a side elevation of cutting apparatus embodying the present invention;

Fig. 2 is a top plan view of the apparatus shown in Fig. 1, at right angles to its axis;

Fig. 3 is an end view of the cutter head of the embodiment of Figs. 1 and 2;

Figs. 4 and 5 are exploded sectional views, taken respectively on the lines 4—4 and 5—5 of Fig. 3, of the two die members which are assembled together to form the cutter head as shown in Figs. 1 to 3, illustrating the arrangement and interrelationship of the blades in the two dies;

Fig. 6 is a detail view of a pair of the cutting blades, illustrating one manner of assembling opposite blades in the die members;

Fig. 7 is a view similar to Fig. 6 illustrating another way of assembling opposite blades in the die members.

The present invention is concerned mainly with the construction of the cutter head and any suitable means may be employed for forcing the fruit slices axially through the head. The particular means for this purpose shown in Figs. 1 and 2, comprises a semi-circular trough 10 closed adjacent its rearward end by means of a semi-circular cover 12, the trough being mounted on a main frame 14 which in turn is secured to an auxiliary frame 16 provided with clamps 18 for attachment to a cannery packing table (not shown).

At one side of the trough 10 and extending parallel thereto is a guide rod 20, fastened in lugs 22 at opposite ends of the trough. On the rod 20 is slidably and rotatably mounted a sleeve 24 carrying a pusher plate 26 normally resting in the trough as shown but provided with a handle 28 by which it may be lifted out of the trough through rotation of the sleeve 24 on the rod 20. Slidably mounted on the rod 20 at opposite ends of the sleeve 24 are a crosshead sleeve 30 and a collar 32 held in fixed relation to the sleeve 24 by a connecting rod 34.

Sliding of the pusher plate 26 along the trough is effected by means of a hand lever 36 in the form of a bell crank pivoted to the frame 14 at 38 and connected to crosshead sleeve 30 by a link 40 pivoted at its opposite ends to the lever 36 and the sleeve 30.

In use, a charge of pineapple slices is placed in the trough 10 to the rear of the pusher plate 26 and the lever 36 is pressed inwardly toward the trough 10, as indicated by the arrow and dotted lines in Fig. 2, thus, through link 40 and sleeve 30, sliding sleeve 24 and the attached pusher plate rearwardly, and the pusher plate in turn sliding the charge of slices rearwardly in the trough 10 under the cover 12 and into the cutter head, designated generally at 50. A stop 42 on the rod 20 engages the collar 32 to limit rearward movement of the plate 26. The lever 36 is then returned to the original full line position of Fig. 2 in which it is stopped by engagement with a stop plate 44, a fresh charge of slices is inserted, and the action is repeated.

Cutter head 50 comprises two die members or cutters, a first stage cutter 52 and a second stage cutter 54. Cutters 52 and 54 are of generally similar construction comprising respectively an annular housing 56 and 56' provided interiorly with a longitudinal cylindrical passage 58, 58' of substantially the same diameter as the pineapple slice. Exteriorly, each of the housings 56 and 56' is provided at its forward end with an annular notch 60, 60' and at its rearward end with a projecting ring 62, 62' pierced, at opposite sides of the housing, by bolt holes 64, 64'. The rearward end of the interior passage 58 of the first stage cutter 52 is provided with an annular notch 66 adapted to receive therein the lip 68 formed on the front end of the second stage cutter by the notch 60'.

Fixed to the rear end of the trough 10 is a casing 70 having a cylindrical inner longitudinal passage 72 provided with annular shoulders 74 and 76 at its forward end, said passage being adapted to receive the first stage cutter 52 therein up to the ring 62 with the interior passage 58 coaxial with the trough 10. The second stage cutter 54 is assembled to the first stage cutter with the lip 68 seated in the notch 66 and the two cutters are held in fixed relation to the trough 10 by means of bolts 78 passing through the bolt holes 64' and 64 in the rings 62', 62 of the two cutters and received in threaded apertures in suitable lugs 80 on the exterior of the casing 70.

The first stage cutter is provided with a plurality of parallel cutting blades 82 mounted in pairs seated in opposite slots 84 on the inner walls of the housing 56. Likewise, cutter 54 is provided with a plurality of parallel cutting blades 82' mounted in pairs seated in opposite slots 84' in the inner walls of the housing 56'. As shown in Figs. 3–5, when the two cutters are assembled, the blades 82 of the first stage cutter are disposed at substantially right angles to the blades 82' of the second stage cutter. It will thus be evident that as the pineapple slices are forced axially through the two cutters, the blades of the first stage cutter will divide the slices into strips by cutting in one direction across the slices while the blades of the second stage cutter will subdivide these strips into smaller portions by cuts transverse to those of the first stage cutter. By suitable spacing of the blades in each cutter, a number of perfect cubes will thus be produced and also a number of more or less irregular shaped portions, as indicated in Fig. 3.

Referring particularly to Figs. 4–7, it will be seen that the cutting edges 86 and 86' of the blades 82 and 82' slope inwardly from the forward end toward the rearward end of their respective housings. The cutting edges of pairs of blades at the sides of the central pairs meet adjacent their inner ends; the cutting edges of the central pairs of blades extend inwardly only sufficiently to enter the center void of the pineapple slice. It will thus be seen that the cutting action of the blades is across the slice, from the outside toward the inside in the instance shown. This action of the blades is important in preventing tearing of the fruit, producing a clean cut and maintaining the fruit accurately centered during cutting.

With sloping cutting blades such as those shown, there is a tendency for the small tough fibres of the pineapple slices to slide rearwardly along the cutting edge, particularly when the latter becomes dull. If the cutting edges of the side pairs of blades terminate at their point of juncture, on dulling of the blades, these fibres are not cleanly cut and the result is a rough, frayed edge on that portion of the slice passing the adjoining ends of the blades. Moreover, if the blades are sharpened, a space is left between their rearward ends with a similar undesirable effect.

I have found that these difficulties can be avoided by slightly overlapping the rearward ends of the cutting edges of blade pairs. Two acceptable methods of producing a proper overlap of the cutting edges are illustrated in Figs. 6 and 7. In Fig. 6, the blades are slightly disaligned peripherally of the housing to permit the rearward inner tip of one blade to pass beyond the inner rearward tip of the other. This offset need be so slight, on the order of 1/64th inch with the usual blades, as to produce no noticeable disalignment of the cuts produced by the two blades. In Fig. 7, one of the blades, although disposed in the same plane as the other, is set further to the rear of the housing so that the inner tip of its cutting edge projects rearwardly beyond the inner tip of the cutting edge of the other blade in the same plane. The overlap need be but slight, about 3/16ths of an inch being sufficient in most cases.

Blades overlapped in the manner indicated continue to cut cleanly despite dulling, apparently because of the shearing or scissors effect of the overlapped portions of the cutting edges.

Referring again to Figs. 4 and 5, it will be noted that the pairs of blades 82 of the first stage cutter 52 between the outermost pairs project considerably to the rear of the housing 56, the center pairs somewhat more than the others. It will also be observed that the cutting edges of these blades are so sloped that their cutting action on a slice is not completed until the slice has passed well into the second stage cutter 54. This is an important aspect of the invention since the slice is thus held in proper axial position by these projecting, still cutting, ends of the blades of the first stage cutter until the blades of the second stage cutter have entered the fruit sufficient to maintain it against axial shifting. Accuracy of the cutting of the two cutters according to the prearrangement of the two sets of blades is thus assured.

The slope of the blades of the second stage cutter provides a wedge-shaped opening at the center in which the oppositely extending projecting ends of the blades of the first stage cutter are received clear of the blades of the second stage cutter.

The outer edge of the blades is provided with a projecting tab 88 or 88' which is received in one of the slots 84 or 84' in the corresponding housing 56 or 56'. The projecting ends of blades of the first stage cutter are offset inwardly from this tab portion as indicated at 90 to prevent interference with the outer pairs of blades of the second stage cutter.

The cut portions of the slices as they are discharged from the rearward end of the second stage cutter by the action of the pusher on succeeding slices may be received in any suitable receptacle, such as the tray 92 conveniently supported by the auxiliary frame 16.

It will thus be seen that the present invention provides a cutter head for cubing or criss-cross cutting pineapple slices, which is simple and inexpensive to build, which cuts accurately and cleanly, and which includes no moving parts. It should be understood that while use of the particular feeding mechanism shown and described for passing the slices through the cutter head is advantageous, it is not essential and other types of feeding means may be utilized; also that various changes may be made in the details of construction of the preferred embodiment of the drawings without departing from the spirit and scope of the invention.

I claim:

1. In apparatus for cutting pineapple slices and the like, a cutter head comprising a first set of fixed substantially parallel blades at the forward end of said head and adapted to cut the slices forced axially through said head into transverse strips, and a second set of fixed substantially parallel blades at the rear of said first set, and spaced therefrom, said second set of blades disposed transverse to the blades of said first set and adapted to subdivide the strips cut by said first set of blades into cubic pieces, the blades of each said set provided with cutting edges extending longitudinally of said head at an incline to the axis thereof.

2. In apparatus for cutting pineapple slices and the like, a cutter head comprising a first set of fixed substantially parallel blades at the forward end of said head and adapted to cut the slices forced axially through said head into transverse strips, and a second set of fixed substantially parallel blades at the rear of said first set and spaced therefrom, said second set of blades disposed transverse to the blades of said first set and adapted to subdivide the strips cut by said first set of blades into cubic pieces, the blades of each said set provided with cutting edges extending longitudinally of said head at an incline to the axis thereof, at least some of the blades of said first set having their cutting edges extending rearwardly beyond the forward ends of the cutting edges of the blades of said second set.

3. In apparatus for cutting pineapple slices and the like, a cutter head comprising a casing forming a tubular cutting chamber of substantially the same diameter as the slices, a first set of fixed substantially parallel blades mounted in said casing and projecting into the forward end of said chamber, and a second set of fixed substantially parallel blades mounted in said casing and projecting into the rearward end of said chamber in spaced substantially transverse relationship to the blades of said first set, the blades of each set being provided with cutting edges extending longitudinally of said chamber at an incline to the axis thereof.

4. In apparatus for cutting pineapple slices and the like, a cutter head comprising a casing forming a tubular cutting chamber of substantially the same diameter as the slices, a first set of fixed substantially parallel blades mounted in said casing and projecting into the forward end of said chamber, and a second set of fixed substantially parallel blades mounted in said casing and projecting into the rearward end of said chamber in spaced substantially transverse relationship to the blades of said first set, the blades of each set being provided with cutting edges extending longitudinally of said chamber at an incline to the axis thereof, at least some of the blades of said first set having their cutting edges extending rearwardly beyond the forward ends of the cutting edges of blades of said second set.

5. In apparatus for cutting pineapple slices and the like, a cutter head comprising a casing forming a tubular cutting chamber of substantially the same diameter as the slices, a first set of fixed substantially parallel blades mounted in said casing and projecting into the forward end of said chamber, a second set of fixed substantially parallel blades mounted in said casing and projecting into the rearward end of said chamber in spaced substantially transverse relationship to the blades of said first set, the blades of each set being provided with cutting edges extending longitudinally of said chamber at an incline to the axis thereof, and means for forcing a charge of slices axially through said chamber.

6. In apparatus for cutting pineapple slices and the like, a cutter head comprising a casing forming a tubular cutting chamber of substantially the same diameter as the slices, a first set of fixed substantially parallel blades mounted in said casing and projecting into the forward end of said chamber, and a second set of fixed substantially parallel blades mounted in said casing and projecting into the rearward end of said chamber in spaced substantially transverse relationship to the blades of said first set, the blades of each said set provided with cutting edges sloping inwardly of said chamber from a forward end adjacent said casing to a rearward end adjacent the axis of said chamber.

7. In apparatus for cutting pineapple slices and the like, a cutter head comprising a casing forming a tubular cutting chamber of substantially the same diameter as the slices, a first set of fixed substantially parallel blades mounted in said casing and projecting into the forward end of said chamber, and a second set of fixed substantially parallel blades mounted in said casing and projecting into the rearward end of said chamber in spaced substantially transverse relationship to the blades of said first set, the blades of each said set provided with cutting edges sloping inwardly of said chamber from a forward end adjacent said casing to a rearward end adjacent the axis of said chamber, at least some of the blades of said first set having their cutting edges extending rearwardly beyond the forward ends of the cutting edges of blades of said second set.

8. In apparatus for cutting pineapple slices and the like, a cutter head comprising a casing forming a tubular cutting chamber and a set of fixed substantially parallel blades mounted in said casing and projecting into said chamber, said blades provided with cutting edges sloping inwardly of said chamber from a forward end adjacent said casing to a rearward end adjacent the axis of said chamber, at least some of said blades being arranged in pairs projecting toward each other from opposite sides of said chamber and having the inner rearward ends of their cutting edges overlapped.

9. In apparatus for cutting pineapple slices and the like, a cutter head comprising a casing forming a tubular cutting chamber, a first set of fixed substantially parallel blades mounted in said casing and projecting into said chamber adjacent the forward end thereof, and a second set of fixed substantially parallel blades mounted in said casing and projecting into the rearward end of said chamber in spaced substantially transverse relationship to the blades of said first set, the blades of each said set being provided with cutting edges sloping inwardly of said chamber from a forward end adjacent said casing to a rearward end adjacent the axis of said chamber, at least some of the blades of each said set being arranged in pairs projecting toward each other from opposite sides of said chamber and having the inner rearward ends of their cutting edges overlapped.

ROBERT FLEMING HEALY.